United States Patent [19]

Ruan

[11] Patent Number: 5,660,220

[45] Date of Patent: Aug. 26, 1997

[54] PLEATED FAN TYPE SUN SHADE FOR MOTOR VEHICLES

[76] Inventor: Ying Chao Ruan, 10501 E. 63rd St., Raytown, Mo. 64133

[21] Appl. No.: 540,958

[22] Filed: Nov. 20, 1995

[51] Int. Cl.[6] .................................................. A47H 5/00
[52] U.S. Cl. ................................ 160/84.07; 160/370.23
[58] Field of Search ........................... 160/134, 84.07, 160/370.21, 370.23, DIG. 2, DIG. 3; 296/97.7, 97.8

[56] References Cited

U.S. PATENT DOCUMENTS

| | | | |
|---|---|---|---|
| 1,609,877 | 12/1926 | Kendall | 160/84.07 |
| 3,880,461 | 4/1975 | Flanagan . | |
| 4,202,396 | 5/1980 | Levy . | |
| 4,332,414 | 6/1982 | Surtin | 160/134 X |
| 4,606,572 | 8/1986 | Maguire | 160/134 X |
| 4,647,102 | 3/1987 | Ebrahimzadeh . | |
| 4,652,039 | 3/1987 | Richards . | |
| 4,671,334 | 6/1987 | Yadegar et al. . | |
| 4,681,149 | 7/1987 | Tung-Chow | 160/134 |
| 4,727,920 | 3/1988 | Siegler . | |
| 4,736,980 | 4/1988 | Eubanks . | |
| 4,775,180 | 10/1988 | Phillips . | |
| 4,776,380 | 10/1988 | Lester | 160/134 |
| 4,777,994 | 10/1988 | Nederveld . | |
| 4,805,955 | 2/1989 | Levy . | |
| 4,838,335 | 6/1989 | Eskandry et al. . | |
| 4,861,090 | 8/1989 | Gavrieli | 160/134 |
| 4,877,074 | 10/1989 | Castellano . | |
| 4,878,708 | 11/1989 | Champane . | |
| 4,883,304 | 11/1989 | Elliott . | |
| 4,903,748 | 2/1990 | Foraker . | |
| 4,932,771 | 6/1990 | Nowottny . | |
| 4,944,548 | 7/1990 | Payne et al. . | |
| 4,947,920 | 8/1990 | Moll . | |
| 4,974,655 | 12/1990 | Teachout . | |
| 5,002,112 | 3/1991 | Schnebly et al. | 160/84.07 |
| 5,004,285 | 4/1991 | Bennett . | |
| 5,042,550 | 8/1991 | Yee . | |
| 5,044,686 | 9/1991 | Acenbrack . | |
| 5,168,912 | 12/1992 | Jelic et al. | 160/84.07 |

OTHER PUBLICATIONS

Popular Science article "Hints From the Model Garage"; p. 181, May, 1953.

*Primary Examiner*—David M. Purol
*Attorney, Agent, or Firm*—Hovey, Williams, Timmons & Collins

[57] ABSTRACT

An automobile windshield shade includes a substantially opaque, pleated sheet having a bottom end, a top end, and a pair of opposite sides. The pleats of the sheet have generally equal widths and are oriented substantially parallel to the sides so that the pleats fold one on top of another when the sides are moved toward one another to collapse the sheet and unfold when the sides are spread apart to expand the sheet. The pleats are prevented from unfolding adjacent the bottom end of the sheet such that the sheet arcuately expands and collapses. The shade further includes a base assembly for placement on the dash of the automobile, wherein the assembly is configured to hold the bottom end of the sheet at substantially the same degree of curvature as the windshield so that the sheet generally follows the curvature of the windshield when expanded.

10 Claims, 6 Drawing Sheets

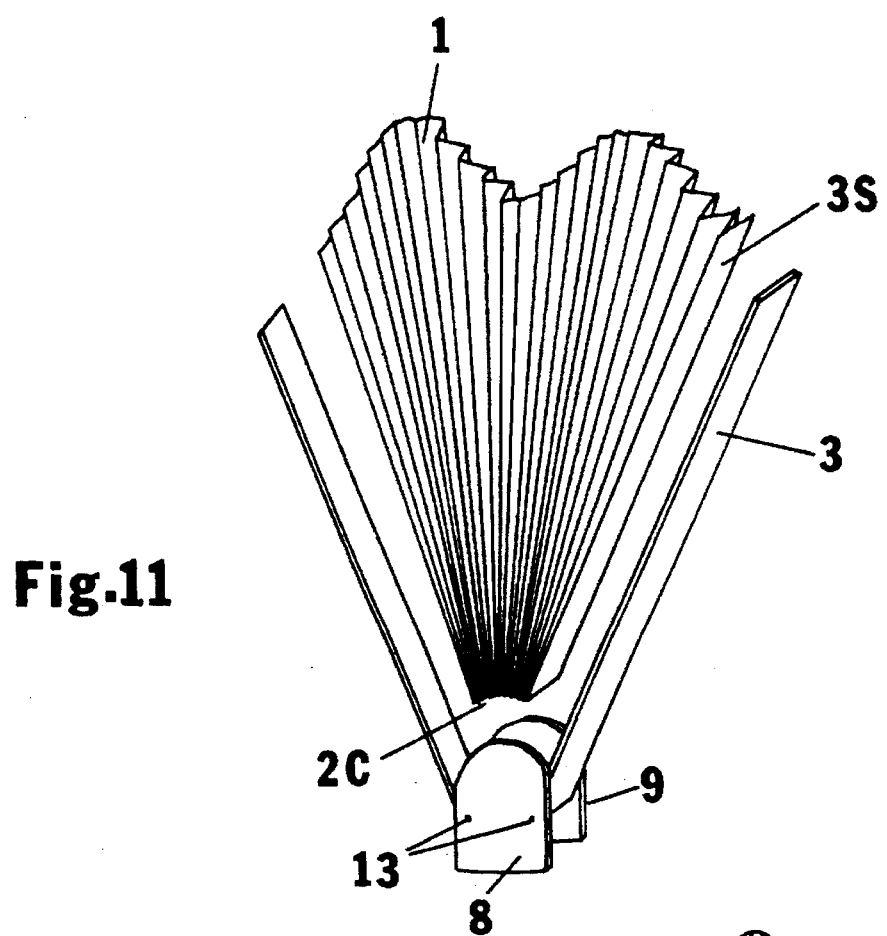
Fig.11
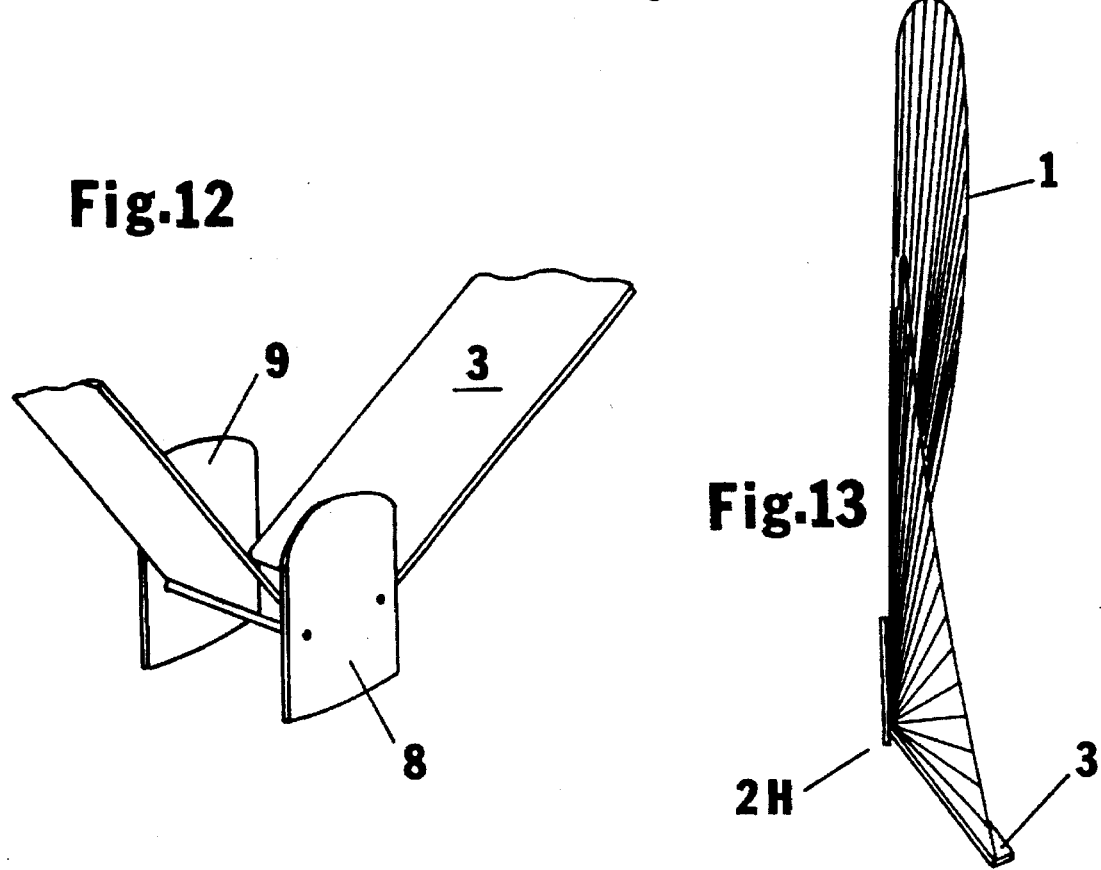
Fig.12
Fig.13

5,660,220

PLEATED FAN TYPE SUN SHADE FOR MOTOR VEHICLES

BACKGROUND OF THE INVENTION

1. Field of the Invention

This invention relates to sun shades or sunshields, especially to vehicle windshield sun shades for motor vehicles when parked.

2. Description of Prior Art

A vehicle windshield sun shade or sunshield is used to block sun rays passing through the windshield of a motor vehicle. Measurements have shown that under direct exposure to sun rays passing through the windshield, the temperature of the dashboard, the steering wheel and other interiors of a parked car can reach 180°–200° F. when the outside temperature is 100° F. Measurements have also shown that with an opaque sheet's blocking, the temperatures of vehicle interiors may be reduced 70°–80° F. Therefore, it is important to provide a satisfactory means to protect the front interior of a parked vehicle against sun rays and blaze.

Since the 1950s, many different windshield sun shades or sunshields for motor vehicles have been put forward. They can principally be categorized into several different groups according to their shading style, including these listed in the following table:

TYPES OF WINDSHIELD SUN SHADE OR SHIELD FOR MOTOR VEHICLES

| Group | Style of Shade | Inventor | Publication | Date |
| --- | --- | --- | --- | --- |
| 1 | Sheet | "Hints from model garage" P. 181, May 1953, POPULAR SCIENCE |  | 5/93 |
|  |  | George P. Flanagan | U.S. Pat. No. 3,880,461 | 4/75 |
| 2 | Vertical Fold | Abraham Levy | U.S. Pat. No. 4,202,396 | 5/80 |
|  |  | Roger H. Richards | U.S. Pat. No. 4,652,039 | 3/87 |
|  |  | Abraham Levy | U.S. Pat. No. 4,805,955 | 2/89 |
| 3 | Horizontal Fold | Donald F. Acenbrack | U.S. Pat. No. 5,044,686 | 9/91 |
|  |  | Ezra D. Eskandry | U.S. Pat. No. 4,838,335 | 6/89 |
|  |  | Horst Moil | U.S. Pat. No. 4,947,920 | 8/90 |
| 4 | Parallelogram | Lawrence D. Siegler | U.S. Pat. No. 4,727,920 | 3/88 |
|  |  | George Yadeger | U.S. Pat. No. 4,671,334 | 6/87 |
| 5 | Triangle Fold | Terill I. Nederveld | U.S. Pat. No. 4,777,994 | 10/88 |
| 6 | Accordion Pleats | Arthur J. Phillips | U.S. Pat. No. 4,775,180 | 10/88 |
| 7 | Roller Shade | Mentora D. Eubanks | U.S. Pat. No. 4,736,980 | 4/88 |
| 8 | Venetian Blind | Kenneth D. Goebel | U.S. Pat. No. 4,932,711 | 6/90 |
| 9 | Window Curtain | Mozaffar Ebrahimzadeh | U.S. Pat. No. 4,647,102 | 3/87 |
| 10 | Outside Cover | Amnon Hanania | U.S. Pat. No. 4,903,748 | 2/90 |
| 11 | Convex Fan Type | Ying-Chao Ruan | The present invention |  |

Among the above existing windshield shades or sunshields the accordion style rectangular foldable shade described in U.S. Pat. Nos. 4,202,396, 4,652,039 and 4,805,955 (Group 2), and the sheet shade made of foil-insulation multilayer material (Group 1) are most widely used. Both the foldable rectangular shade and the multilayer sheet shade are basically a sheet of shading material of a windshield size. When not in use, they are folded or rolled up for storage. When in use, they are stretched to their full length in a horizontal direction and placed behind the windshield. A common problem of using these types of sun shades is that it is inconvenient to stretch them to fully cover the windshield as well as to remove them, because the space between the windshield and the driver's seat inside a vehicle is very limited. The situations may even be worse for the elderly and handicapped, and those drivers who have difficulty reaching the span of the windshield. Also, these shades usually fail to cover the two bottom corner regions of the windshield, because their two sides tend to shrink towards the middle of the shade due to the shrinking tension of the sheet material itself. The foil surface of certain types of these shades raises a further problem. That is when they are stretched to their full length and set behind the windshield, the surface resembles that of a piece of wrinkled metal, which tends to diminish the aesthetic value of the exterior of the vehicle. Further, sunlight reflected by the surface is not visually pleasant to people and may cause passersby to be temporarily blinded which may result in parking lot accidents. Furthermore, hundreds of millions of motor vehicles exist today, and many more are being produced. If a huge number of vehicles use these shades, which reflect sunlight in all directions, they would not improve the harmony of the human environment, which has already seriously been disturbed by modern industry's undesirable side effects.

In this application for U.S. Letter Patent, I am presenting a new style of windshield sun shade, as listed in Group 11 in the table mentioned before. The new shade is a convex accordion pleated hand fan-like device for covering the windshield from behind. This invention is highly efficient in blocking sun rays; most convenient to use, it has good geometrical factors which lend to its relatively low surface sun ray densities and facilitate the release of heat absorbed from sun rays; in addition, it has a quite pleasant appearance and can even beautify vehicles.

OBJECTS AND SUMMARY OF THE INVENTION

It is a general object of this invention to provide a highly efficiently effective windshield sun shade for motor vehicles when parked.

It is another object of this invention to provide a very convenient windshield sun shade for all drivers to use, including the elderly, the handicapped and the drivers who have difficulty in reaching the span of the windshield.

It is a related object of this invention to provide a windshield sun shade that has good geometrical factors which reduce the shade's surface sun ray densities and release the heat absorbed from sun rays.

It is a further object of this invention to provide a pleasant-looking windshield sun shade for people to decorate their motor vehicles when parked outdoors.

Another related object of this invention is to provide an attractive windshield sun shade, as a poster-like display for advertisements or messages.

Other objects of this invention will become apparent from the following description of the preferred embodiment of the invention.

In accordance with these objects, the inventive sun shade comprises an accordion style, pleated fan-like device, as shown in FIGS. 1-4, which has an opened position behind the vehicle windshield for blocking sun rays passing through the windshield, and a closed position in which the shade may conveniently be stored in a relatively small space. The shade preferably comprises an accordion pleated sheet of appropriate shading material with a permanently closed bottom held in an end holder, and with two strengthened sides used as two side handles. The sheet has a cutout portion in its top center region to accommodate the rear view mirror of the vehicle. The holder has a quasi-congruent trapezoidal shape which creates the generally convex shape of the shade when it is opened. The two sides of the sheet are strengthened by mounting on them the appropriate rigid material jointed to the frame in hinging style on the frame's two unparallel sides, respectively. When the two side handles are spread out, they pull the shade to its opened position. When the two handles are pushed inward, they compress the shade to its closed position. These operations are easily, safely and quickly done.

When the opened shade is set behind the windshield in a covering relationship, the shade has its base, particularly the bottom of the holder and the two side handles, sitting on the vehicle dashboard to fit the lower margin of the windshield. Further, the shape of the shade generally conforms to the curvature of the windshield, with the cutout portion accommodating the vehicle's rear view mirror, see FIG. 4.

Thus, the present invention is a highly efficiently effective windshield sun shade for motor vehicles. It is a convenient shade for drivers to use and a light shade for carrying. Particularly, the accordion fan type structure provides stability in its opened state, and thus, a thin light sheet can be used to make the shade. The shade has relatively low surface sun ray density and is highly capable of releasing the heat absorbed from sun rays. These advantages are due to the zigzag surface configuration of the pleated sheet, whereby the pleated sheet has a relatively larger surface area than a flat sheet. It will be appreciated that the surface sun ray density is equal to the total sun ray flow/the total area receiving the sun ray flow, and accordingly, the pleated sheet has a relatively low density. Because the enlarged surface area of the pleated sheet can also more efficiently release heat absorbed from the sun rays, the present invention tends to cool faster than the prior art sunshades. Further, when the shade is in its opened position, its pleats are positioned one-by-one around its closed bottom and gradually unfolded from the closed bottom to its fully opened top, with every pleat fold slightly twisted. Thus, the degree of reflection changes periodically from fold to fold and gradually from top to bottom. The present invention consequently creates a vivid, radiant, and attractive image to decorate a parked vehicle nicely.

DESCRIPTION OF THE DRAWING FIGURES

The present invention and its various objects and aspects may become more readily apparent from the following detailed description of the preferred embodiments illustrated in the accompanying drawings:

FIG. 11 is a perspective view of the pleated shade sheet and a holding system with no side holder walls and holder bottom;

FIG. 12 is a perspective view of the bottom part of the holding system illustrated in FIG. 11;

FIG. 13 is a perspective side view of the shade having the holding system illustrated in FIG. 12, with the shade in an opened condition;

Figure 1:
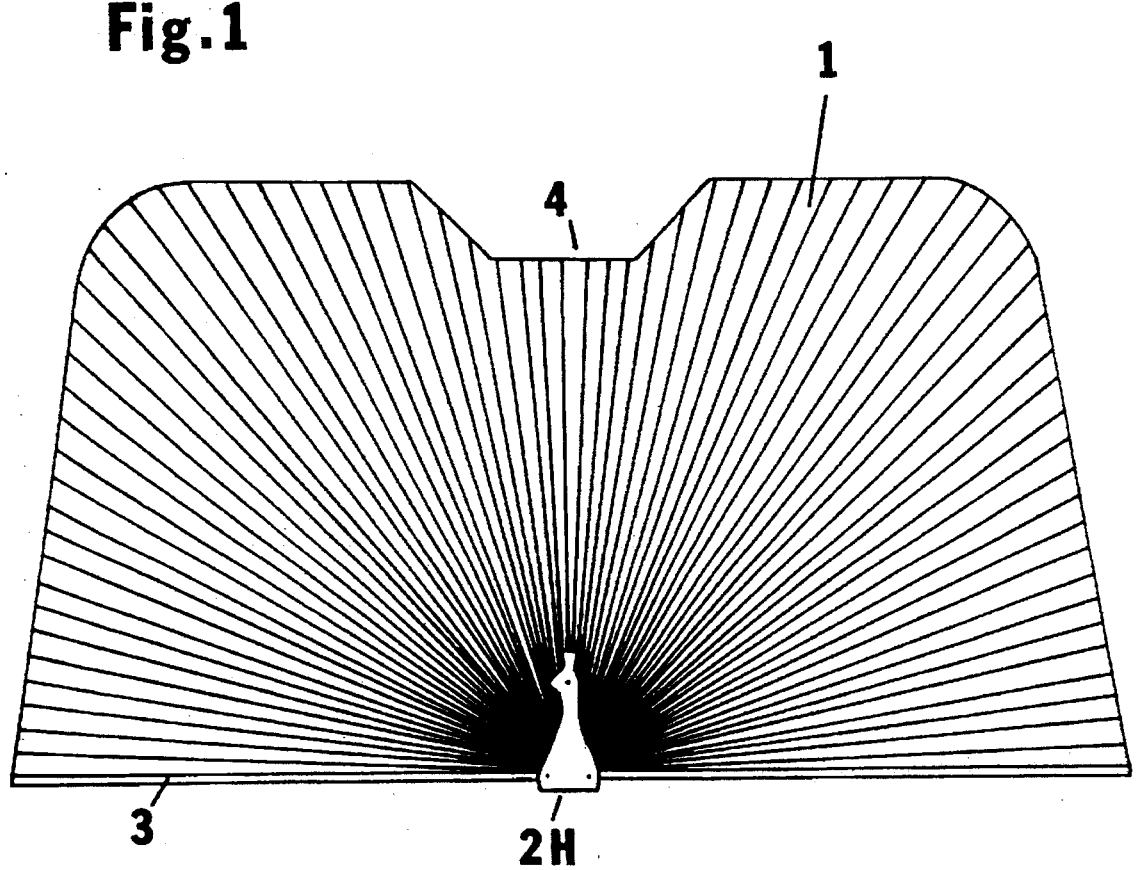
FIG. 1 is a front view of the shade when it is opened.

REFERENCE NUMERALS AND LETTERS IN THE DRAWINGS 1 is the shade sheet after being pleated.

1b is the shade sheet before being pleated.

2 is the closed end of the shade, comprising the closed end of sheet 1 and its holding enclosure.

2C is the closed end of sheet 1.

2H is the end holder for holding the closed end 2C of sheet 1.

2T is an alternative quasi-congruent trapezoidal frame for holding the closed end 2C of sheet 1.

3 is a side handle slat.

3S is a side fold of the shade sheet.

4 is the cutout portion in the top center region of sheet 1.

5 is the rear view mirror of a motor vehicle.

6 is the sunvisor of the motor vehicle.

7 is the present shade when set behind the windshield of a motor vehicle 8 is the front wall of holder 2H.

9 is the rear wall of holder 2H.

10 is a hinge bar.

11 is a side wall of holder 2H.

12 is the bottom of holder 2H.

13 is a bolted bar.

DETAILED DESCRIPTION OF THE PREFERRED EMBODIMENTS

The present invention has different variations within its spirit and scope. A typical one has been shown in FIGS. 1–10 for covering a convex windshield.

FIG. 1 shows the front view of the typical shade when it is in its opened state. The shade comprises a main body including an accordion pleated sheet 1 formed of an appropriate shading material mounted to a base. The base is made up of two rigid slats or side handles 3 extending outwardly from an end holder 2H that holds the closed bottom of the sheet 1. The two handles 3 are swingably jointed to the holder 2H in hinging style. Sheet 1 has a cutout portion 4 in its top center region corresponding in shape and location to the vehicle rear view mirror. All the pleats of the sheet 1 are closed at the bottom in the holder 2H and gradually unfolded till fully opened at top. The fully opened tops of the pleats form the top and the two lateral sides of the shade. The two side pleats of sheet 1 are mounted on handles 3 respectively. The total area of the shade is sufficient for blocking sun rays passing through the vehicle windshield.

Figure 2:
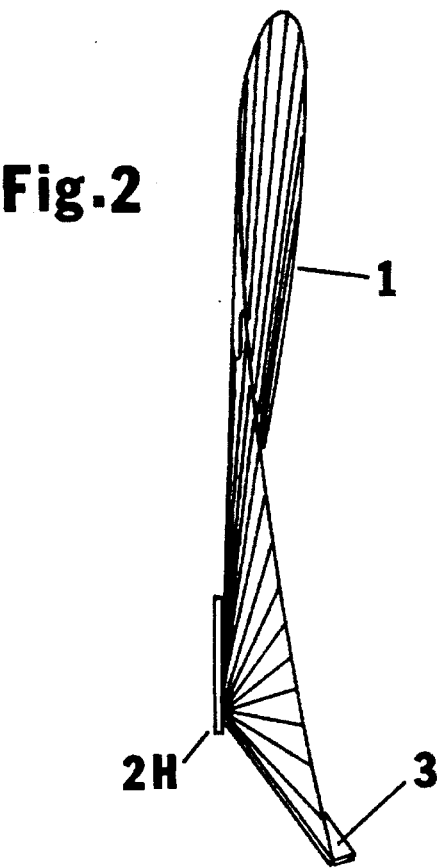
FIG. 2 is a perspective side view of the shade illustrated in FIG. 1.
Figure 4:
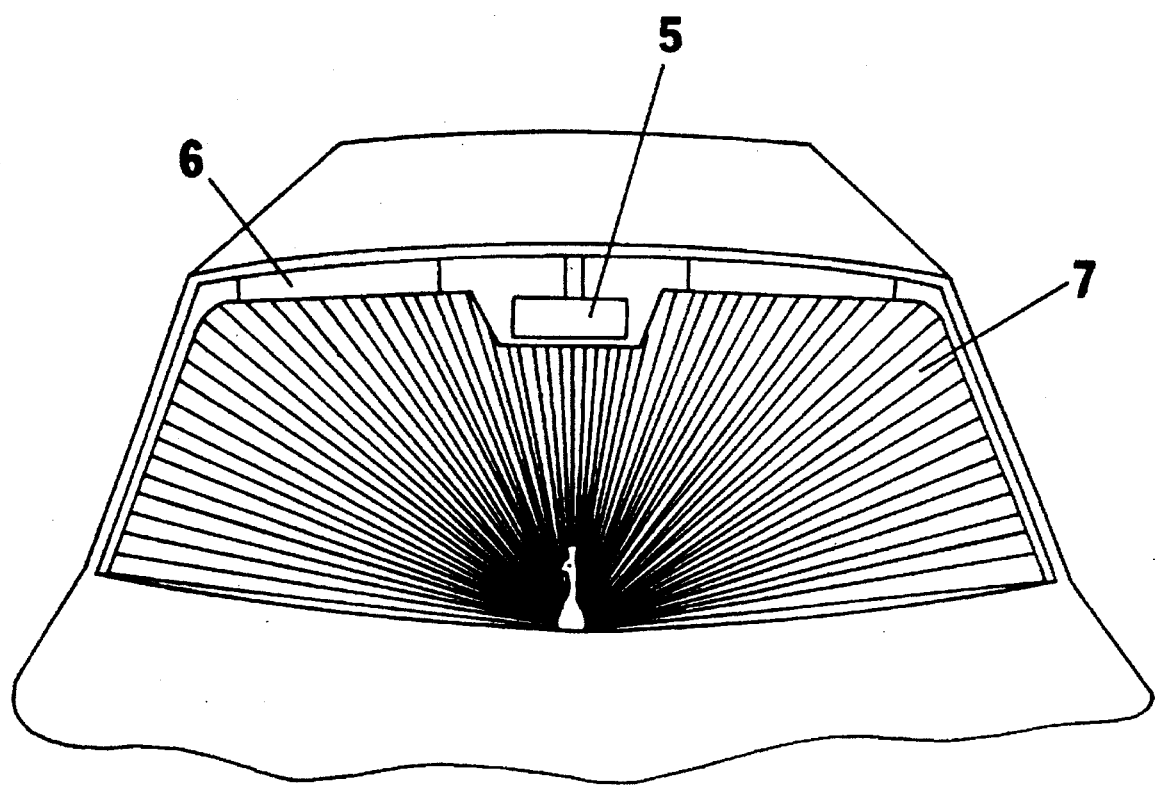
FIG. 4 is a perspective from view of part of a motor vehicle with the shade illustrated in FIG. 1 is set behind its windshield.

FIG. 2 is a perspective side view of the above opened shade. The shade has a convex form to match the windshield's curvature. When the shade is placed behind the vehicle's windshield, it sits on the dashboard. The base of the shade fits the lower margin of the windshield, the top and the two lateral sides of the shade fit the upper margin and the two side margins of the windshield respectively, and the cutout portion 4 of the shade accommodates the vehicle's rear view mirror 5, as shown in FIG. 4.

Figure 3:
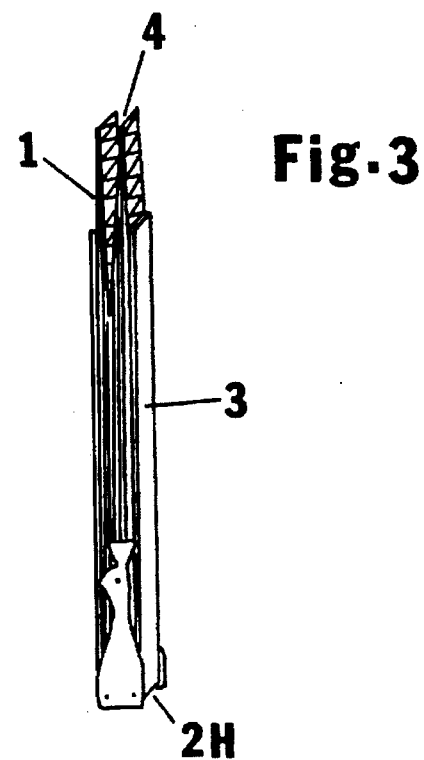
FIG. 3 is a perspective view of the shade illustrated in FIG. 1 when it is closed.

When the shade is not in use, it will be closed and stored with all the pleats compressed together by pushing the handles 3 inwardly toward one another, as shown in FIG. 3.

The more detailed structure of the shade has been shown in FIGS. 5–10.

Figure 5:
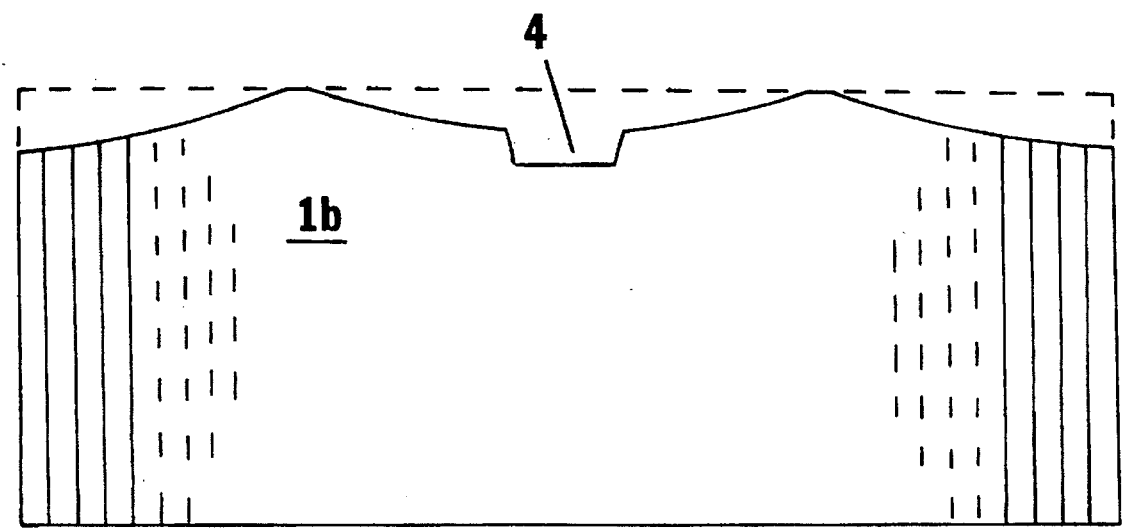
FIG. 5 is a front view of the shade sheet before being pleated.
Figure 6:
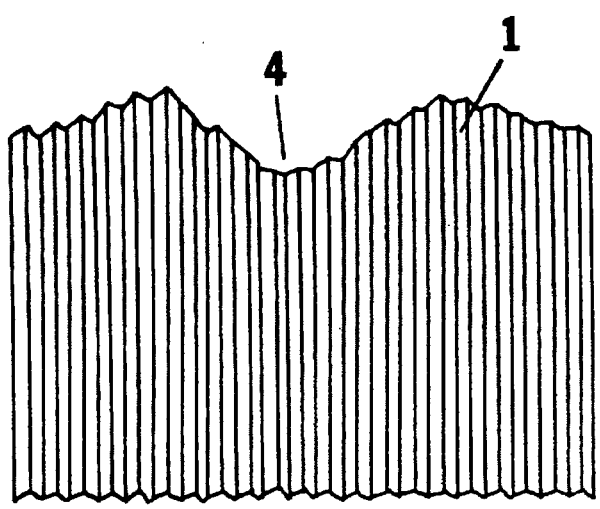
FIG. 6 is a perspective front view of the shade sheet after being pleated.
Figure 7:
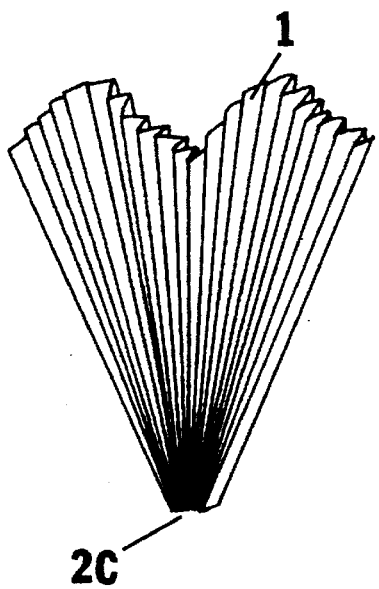
FIG. 7 is a perspective from view of the pleated shade sheet having its bottom closed.

The original, unassembled form of sheet 1 is designated by the symbol 1b in FIG. 5. The unassembled sheet 1b has a straight bottom and two parallel lateral sides perpendicular to the bottom. The top of the unassembled sheet 1b is a certain symmetrical curve having a cutout portion 4 in its center region. The sheet has a large number of parallel narrow folds of uniform width across the length of the sheet, from one side to the other, to form a corresponding number of accordion pleats with front edges and rear edges positioned back and forth, alternatively, as shown in FIG. 6. The bottom of the sheet 1b is permanently closed to form a closed end 2C by an appropriate method, such as gluing, as shown in FIG. 7

Figure 8:
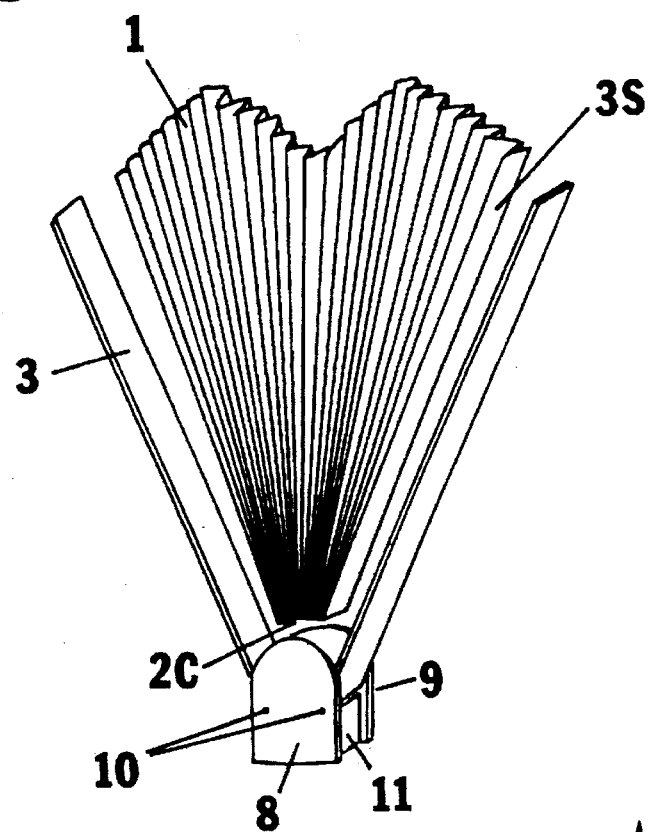
FIG. 8 is a perspective view of the pleated shade sheet and its holding system comprising an end holder and two long pieces of rigid material with their bottom hung on the holder in hinging style.
Figure 10:
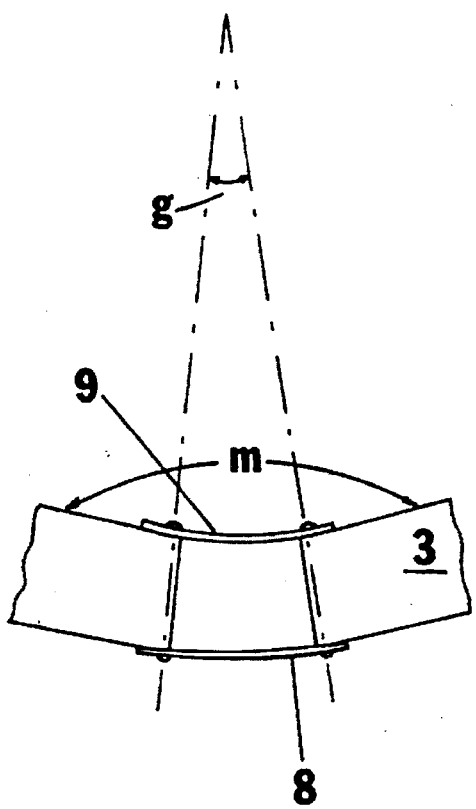
FIG. 10 is a top view of the structure illustrated in FIG. 9.
Figure 9:
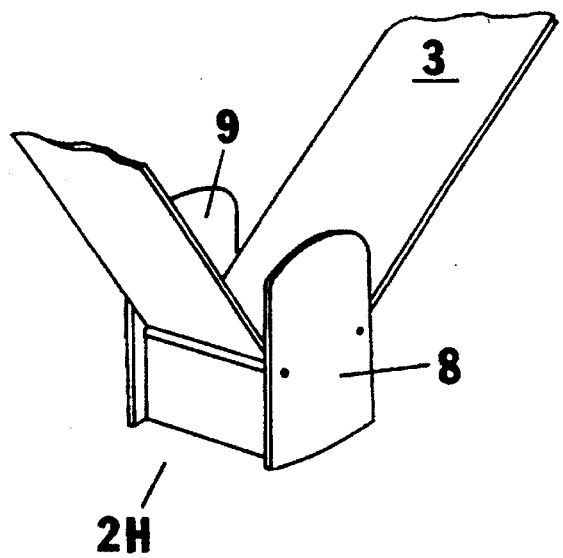
FIG. 9 is a perspective view of the bottom part of the holding system illustrated in FIG. 8.

Assembly of the shade is completed by mounting the above sheet in a holding system, which comprises holder 2H and two handle slats 3 formed of rigid material, as shown in FIG. 8. The lower part of the system is shown in FIG. 9. Holder 2H has a front wall 8 facing the windshield, a rear wall 9 parallel to front wall 8, and two side walls 11 of equal width to make a symmetric frame. The side walls 11 form an angle g with each other with the apex of angle g located behind rear wall 9. The spacing between the side walls 11 is actually equal to the width of the pleat folds of sheet 1. The handles 3 are jointed to holder 2H on its two sides in hinging style by using two hinge bars 10, respectively, such that they may swing about 10. The size of the handles 3 is approximately the same as that of the side folds 3S of sheet 1. The handles form a complementary angle m of angle g when they spread out to their horizontal position, as shown in FIG. 10.

Sheet 1 is mounted inside the holding system with its closed end 2C held in holder 2H and with its two side folds 3S mounted on the handles 3 respectively. The assembled shade is also shown in FIGS. 1–4. (Front wall 8 of holder 2H in FIGS. 1–4 is decorated by a carving of a bird.) With the assembled shade, the two sides of sheet 1 are strengthened by the handles 3, and closed end 2C is protected by holder 2H. When the handles are spread out they stretch the shade to its opened state, as shown in FIG. 1 and FIG. 2. When the handles are pushed inward toward one another, they compress the shade to its closed state shown in FIG. 3.

The value of angle g and its complementary angle m correspond to the windshield's curvature: $g=0°\sim30°$, $m=180°\sim150°$. In a situation where angle $g=0°$ and angle $m=180°$, the shade is not convex in its opened position, which best matches a flat windshield.

Figure 14:
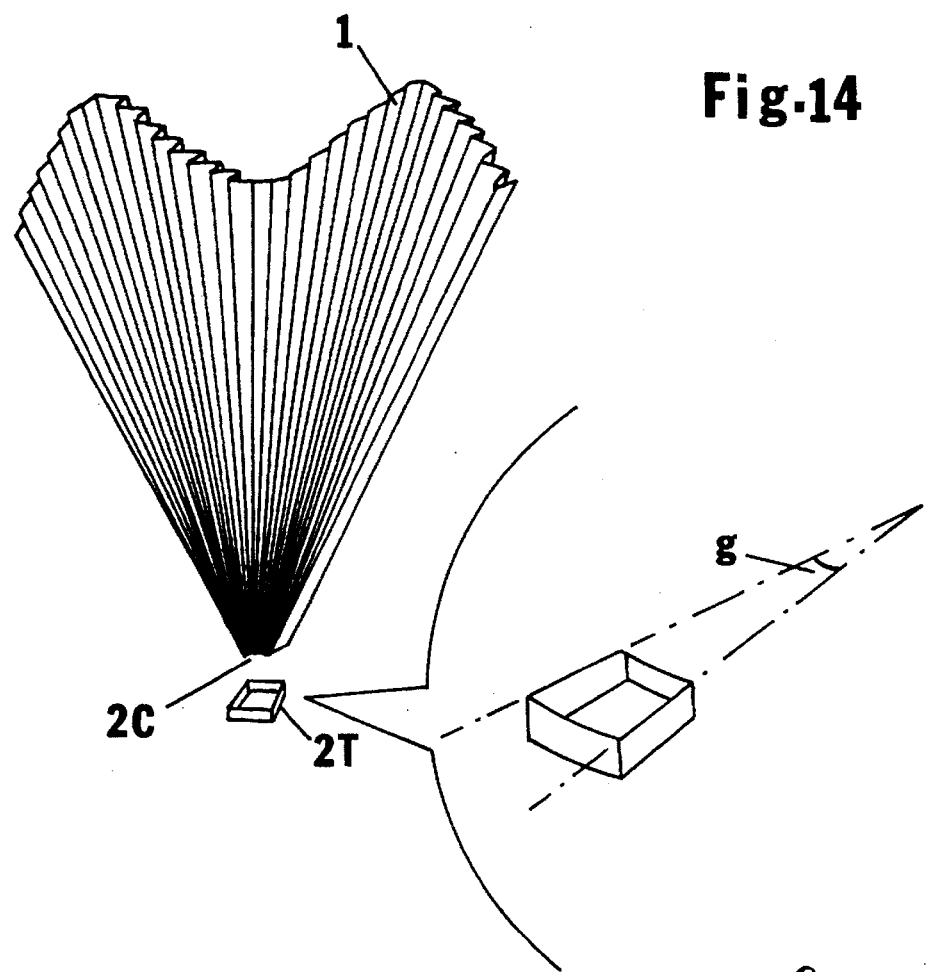
FIG. 14 is a perspective view of a pleated shade sheet and a simple holding frame holder.
Figure 15:
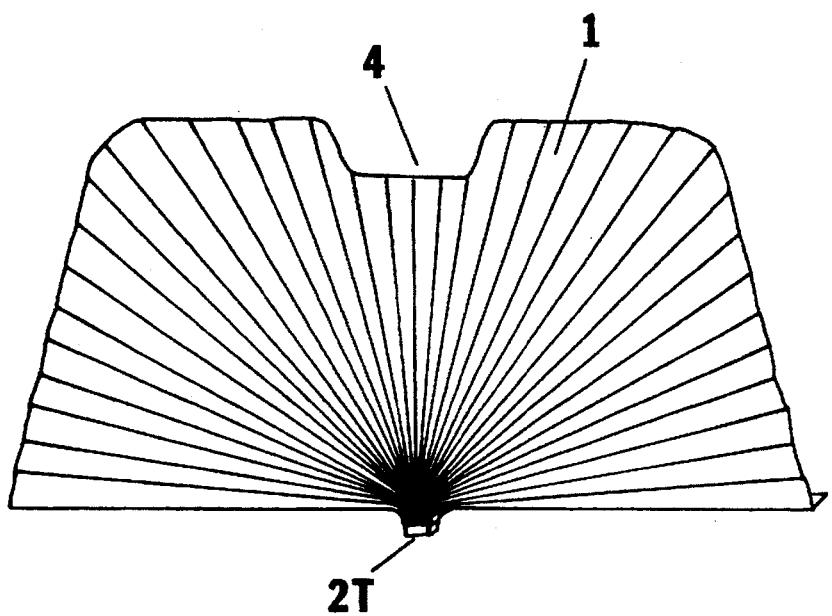
FIG. 15 is a perspective view of the shade having the holding frame illustrated in FIG. 14, with the shade in an opened condition.
Figure 16:
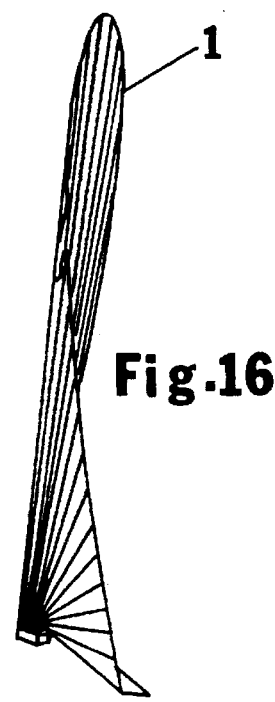
FIG. 16 is a perspective side view of the shade illustrated in FIG. 15.

In some cases, depending on the sheet material, different simplified holding systems can be used, such as the ones illustrated in FIGS. 11–13, where the holder bottom and its two side walls are removed. In this situation the symmetric holder frame consists of the front wall 8, the rear wall 9 and the two bolted hinge bars 13. A further simplified form of the present invention is shown in FIGS. 14–16, where a single symmetric holding frame 2T is used for holding the closed bottom 2C of the sheet 1.

In summary, the basis characteristics of the present invention are as follows:

(a) a pleated fan type sun shade has an opened position corresponding in shape to the vehicle windshield and being placed behind the windshield for blocking sun rays passing therethrough, with the shade having a closed position so that it may be stored in a relatively small space;

(b) the shade comprises a main body including a pleated sheet formed of an appropriate shading material, with the sheet's bottom permanently closed and held in an appropriate holder, and with the two sides of the sheet strengthened so as to be used as two side handles, and with a cutout portion in the sheet corresponding in shape and location to the vehicle's rear view mirror;

(c) the shade is placed in the opened position by spreading the two side handles to their limit position and in the closed position by pushing the two handles inward to compress all the pleats together therebetween.

It is understood that any changes in shade material, adjustment in shape, size, and angles, or change in the form or appearance of the shade parts without changing the functions mentioned above, are within the spirit of the present invention and do not depart from the scope of the present invention.

OPERATION

The method of using this invention is mentioned in the previous description, and therefore the operation is summarized as follows:

First, the user sits in the first row seat inside the motor vehicle and holds the shade in his/her hands; second, the user opens the shade by spreading out the two handles and setting it adjacent the vehicle windshield to cover the windshield from behind; third, the user swings down the sun visors to support the shade in place. After use, the user swings the sun visors up and removes the shade, then closes it for storage.

I claim as my invention:

1. A window shade for obstructing sunlight entering through a window, wherein the window has a degree of curvature from side to side, said shade comprising:

a substantially opaque, pleated sheet having a first end, a second end and a pair of opposite sides, with the pleats of the sheet folding one on top of another when the sides are moved toward one another to collapse the sheet and unfolding when the sides are spread apart to expand the sheet, said pleats being prevented from unfolding adjacent the first end of the sheet such that the sheet arcuately expands and collapses; and a sheet holding assembly configured to hold the first end of the sheet at substantially the same degree of curvature as the window so that the sheet generally follows the curvature of the window when expanded.

2. A window shade as claimed in claim 1, said holding assembly including a frame receiving the first end of the sheet, said frame including a pair of spaced walls extending between the sides of the sheet and having the same degree of curvature as the window.

3. A window shade as claimed in claim 2, said sheet presenting a pair of outermost pleats adjacent each of the sides; and a relatively rigid slat attached to each of the outermost pleats, wherein the slats rigidify the sheet and form handles for manual operation of the shade.

4. A window shade as claimed in claim 3, said slats being swingably connected to the frame.

5. A window shade as claimed in claim 4, said pleats being secured to one another adjacent the first end of the sheet to prevent unfolding thereof.

6. An automobile windshield shade for obstructing sunlight entering through the windshield, wherein the windshield extends upwardly from the dash and has a degree of curvature from side to side, said shade comprising:

a substantially opaque, pleated sheet having a top end, a bottom end and a pair of opposite sides, with the pleats of the sheet folding one on top of another when the sides are moved toward one another to collapse the sheet and unfolding when the sides are spread apart to expand the sheet, said the pleats being prevented from unfolding adjacent the bottom end such that the sheet arcuately expands and collapses; and a base assembly for placement on the dash, said base assembly being configured to hold the bottom end of the sheet at substantially the same degree of curvature as the windshield so that the sheet generally follows the curvature of the windshield when expanded.

7. An automobile windshield shade as claimed in claim 6, said base assembly including a frame receiving the bottom end of the sheet, said frame including a pair of spaced walls extending between the sides of the sheet and having the same degree of curvature as the windshield.

8. An automobile windshield shade as claimed in claim 7, said sheet presenting a pair of outermost pleats adjacent each of the sides; and a relatively rigid slat attached to each of the outermost pleats, wherein the slats rigidify the sheet and form handles for manual operation of the shade.

9. An automobile windshield shade as claimed in claim 8, said slats being swingably connected to the frame.

10. An automobile windshield shade as claimed in claim 9, said pleats being secured to one another adjacent the bottom end to prevent unfolding thereof.

* * * * *